(12) United States Patent
Agajanian (10) Patent No.: US 11,427,321 B2
(45) Date of Patent: Aug. 30, 2022

(54) PASSENGER COMPARTMENT

(71) Applicant: Sarkis Agajanian, Los Angeles, CA (US)

(72) Inventor: Sarkis Agajanian, Los Angeles, CA (US)

( * ) Notice: Subject to any disclaimer, the term of this patent is extended or adjusted under 35 U.S.C. 154(b) by 326 days.

(21) Appl. No.: 16/267,372

(22) Filed: Feb. 4, 2019

(65) Prior Publication Data

US 2019/0168877 A1 Jun. 6, 2019

Related U.S. Application Data

(63) Continuation-in-part of application No. 14/257,879, filed on Apr. 21, 2014, now abandoned, which is a continuation-in-part of application No. 13/432,422, filed on Mar. 28, 2012, now abandoned.

(60) Provisional application No. 61/468,282, filed on Mar. 28, 2011.

(51) Int. Cl.
*B64D 11/00* (2006.01)
*B64D 25/12* (2006.01)
*B64C 1/06* (2006.01)

(52) U.S. Cl.
CPC .............. *B64D 11/00* (2013.01); *B64C 1/062* (2013.01); *B64D 25/12* (2013.01); *B64C 2211/00* (2013.01); *B64D 2011/0046* (2013.01)

(58) Field of Classification Search
CPC .. B64D 11/00; B64D 25/12; B64D 2011/046; B64D 25/00; B64C 1/062; B64C 2211/00; B64C 2211/0046; B64C 1/069
See application file for complete search history.

(56) References Cited

U.S. PATENT DOCUMENTS

| | | | | |
|---|---|---|---|---|
| 3,643,899 A | * | 2/1972 | Firestone | B64C 1/28 244/118.5 |
| 3,871,695 A | * | 3/1975 | Koenig | B60R 19/56 293/118 |
| 4,267,987 A | * | 5/1981 | McDonnell | B64D 39/00 244/137.4 |
| 6,010,093 A | * | 1/2000 | Paulson | B64B 1/50 244/24 |
| 6,102,332 A | * | 8/2000 | Haxton | B64C 39/10 244/118.2 |
| 6,224,015 B1 | * | 5/2001 | Reinhard | B61B 7/00 244/24 |
| 6,536,828 B2 | * | 3/2003 | Love | B60J 3/04 296/96.19 |
| 8,140,200 B2 | * | 3/2012 | Heppe | B64D 47/08 701/16 |
| 8,496,279 B2 | * | 7/2013 | Aoki | B66C 13/08 294/82.15 |

(Continued)

*Primary Examiner* — Medhat Badawi
*Assistant Examiner* — Vicente Rodriguez
(74) *Attorney, Agent, or Firm* — Marshall Lerner; Steven Kim; Kleinberg & Lerner LLP.

(57) ABSTRACT

A passenger module that may be connected to an aircraft for transport, and may be detached and attach different module for carriage to a different destination. In alternative embodiments involving different aircrafts such as fixed wing and helicopter aircraft, a module may be adapted to have a transparent exterior so that passengers may have a broad range of unobstructed view of the outside surroundings. The module may have a range of free movements while still connected to the aircraft for such purposes as sightseeing.

12 Claims, 11 Drawing Sheets

(56) References Cited

U.S. PATENT DOCUMENTS 9,027,879 B1 * 5/2015 Talmage, Jr. ......... B64C 27/006
                                                    244/118.2
9,180,981 B2 * 11/2015 Lopez Urdiales ....... B64G 1/12

* cited by examiner

PASSENGER COMPARTMENT

This application is a continuation-in-part of a co-pending U.S. application Ser. No. 14/257,879 filed on Apr. 21, 2014, and claims the benefit of U.S. application Ser. No. 13/432,422 filed on Mar. 28, 2012, and claims the benefit of U.S. Provisional Application Ser. No. 61/468,282, filed on Mar. 28, 2011.

BACKGROUND OF THE INVENTION

1. Field of the Invention

The present invention relates to passenger compartments and, more particularly, a passenger compartment for aircrafts.

2. General Background and State of the Art

In the past, an aircraft has been designed so that the fuselage had mounted to it wings for lift and incorporate all of the features of the aircraft, including the command and control section. An aircraft was a fully integrated unit with all of the elements as parts of a whole.

A fully integrated passenger aircraft would have substantial delays during passenger boarding and disembarking. Also, if the aircraft's engine or flight controls were not functioning, the entire aircraft, including other non-damaged and functional parts would be, by association, out of commission as well.

Touring aircrafts provide passengers limited visibility of the sights and sounds of popular travel destinations. A fixed seating area to the aircraft forces passengers to vie for a line of sight with other passengers. Passengers also have reduced hearing because of their close proximity to the aircraft's engines.

What is needed and what is provided by the invention is a detachable passenger module from the aircraft which enables efficient and comfortable boarding and disembarking. The passenger module is also capable of a free range of movements relative to the position of the aircraft which benefits the touring industry. The passenger module, when coupled to the aircraft, would be airworthy.

INVENTION SUMMARY

According to the present invention, a passenger module that is modular and can be connected and detached from an aircraft. The aircraft may be configured to have a power module which includes wings, a tail including rudder and elevators along a common spine which also has a command and control cockpit. Connected support arms terminate in landing gear which may be wheels, skis, skids, or even pontoons. The power module may also include rotor, rotor mast, rotor blades, turbine tail pipe, a tail rotor, tail fins, and a tail rotor drive shaft.

The passenger module would include all the passenger amenities, including a seating area, where seats may be placed in different configurations within the seating area, overhead storage, lavatories, one or more galleys, and accommodations for cabin crew. Some passenger modules may be especially configured for sightseeing and would include transparent sections in the fuselage which would provide largely unobstructed views to the passengers. Furthermore, the passenger modules may be configured to tilt, rotate, or even be lowered from the power module. The lowering could be used for greater sightseeing views or passenger module detachment or loading.

A power motor attached to an extended arm that is attached to the passenger module is utilized for tilting, rotating, or lowering the passenger module. Tilting, rotating, and lowering mechanisms are all independent from the aircraft's flight mechanism.

The passenger module includes a safety system utilizing crash bars which allow protection to the forward Plexiglas module in case of an emergency landing. In addition, to add more safety means, the passenger module may be sealed and water-tight, may float, and may have an emergency escape hatch in rear top.

The passenger module has fixed landing wheels may serve as additional landing gear or which give the passenger module the ability to land in case of an aircraft emergency after the passenger module gets detached from the aircraft.

Passenger modules may be adapted for carrying cargo. Yet other modules may be specially configured for special purposes such as fire fighting and could include tanks for fire retardant liquids or other fire fighting supplies. Yet other modules could be configured as medical air evacuation units with equipment to provide medical treatment in flight.

While the preferred embodiment may be a fixed wing aircraft, a helicopter equivalent is envisaged, much like the Sikorsky Skycrane which was designed to carry cargo suspended on cables. According to the present invention, cargo modules are attached to the frame and are locked in place.

One advantage to the present invention is that module could be loaded in advance and would be deployed on the tarmac. A tractor aircraft would drop off a module and pick up a new module to be transported to a destination. In the case of passenger modules, the modules could be pre-boarded by the passengers and then picked up by the aircraft. The dropped off module could then disembark passengers without delaying the aircraft.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 5, including

FIG. 6, including

FIG. 7, including

FIG. 9 including

DETAILED DESCRIPTION OF THE PREFERRED EMBODIMENTS

Figure 1:
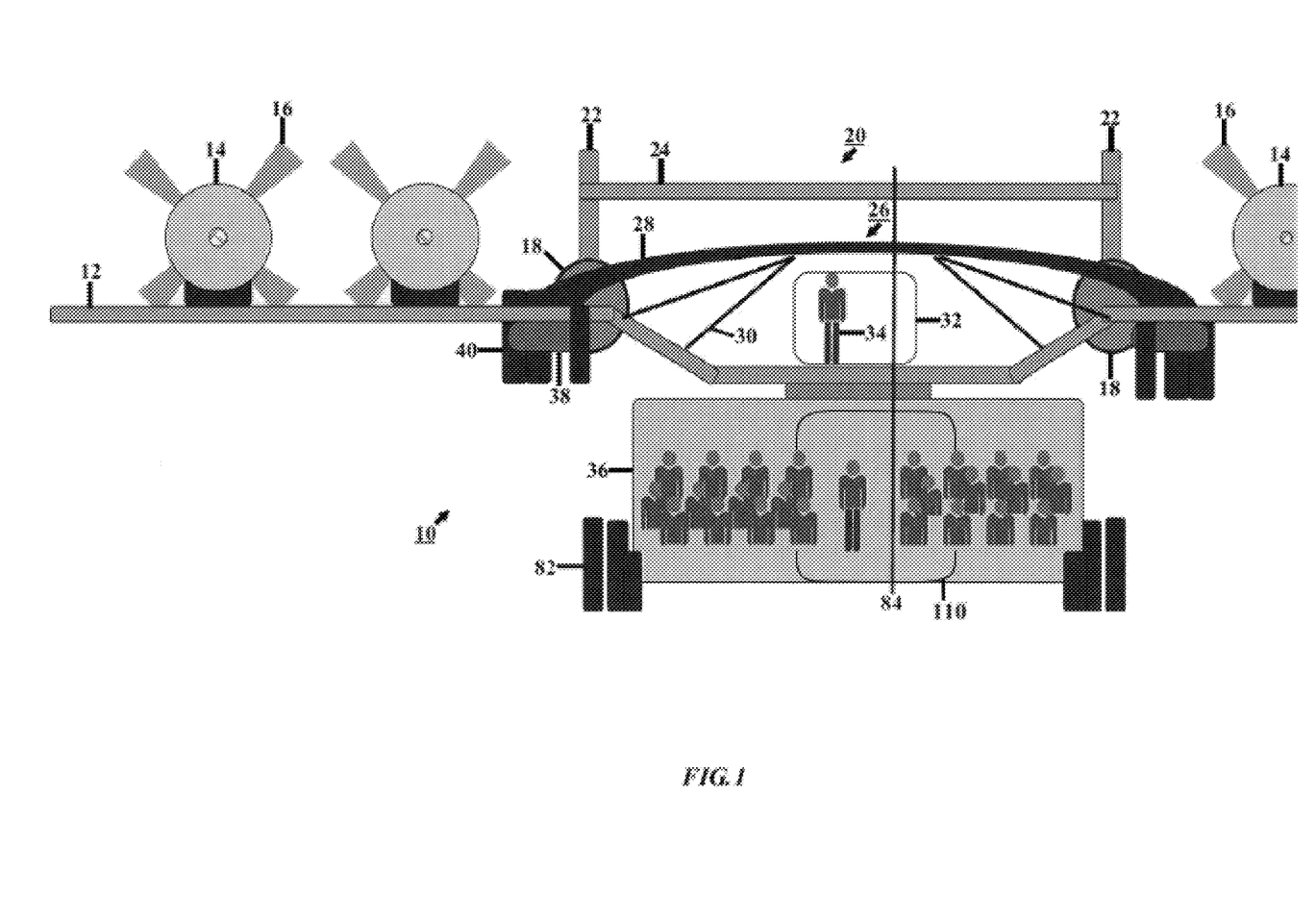
FIG. 1 is a portion of an idealized frontal view of a tractor aircraft with a passenger module according to the present invention.

Turning first to FIG. 1, there is shown, a partial frontal view of a hybrid tractor fixed wing aircraft 10. Because the craft is symmetrical about a longitudinal axis, only a portion of a wing 12 is shown. It should be readily understood that the broken half of the wing illustrated here will be identical to the half that is shown.

As shown, the aircraft 10 is fitted with four engines 14, here shown with propellers 16 although in other embodiments, jet engines can be used, as well. Similar to the P-38 aircraft of World War II, twin booms 18 extend from the wing 12 to the tail assembly 20 which includes vertical and horizontal stabilizers 22, 24, respectively. An insert 24 may be used in combination with the interactive device 10.

A reinforcing structure is added to add rigidity to the wing 12. While such a structure may not be necessary on a suitably robust wing construction, for lighter, more fragile wings the reinforcement is useful. An arch 28 spans the center portion of the wing 12 and support struts 30 add rigidity.

A command and control module 32 is permanently attached to the wing 12 and serves as a flight deck for the pilot 34 and flight crew. Mounted to the tractor aircraft 10 and considered a separate attachment of the aircraft 10 is a passenger bearing sightseeing module 36 which is optimized for tourists. Supporting the tractor aircraft 10 when on the ground are rotatable pylons 38 which may terminate in landing wheels 40.

The module 36 may include all the passenger amenities, including seats, overhead storage, lavatories, one or more galleys 110, automated food and beverage service, theater screens, and accommodations for cabin crew. The module may be used for sightseeing similar to the construction of a gondola. Clear materials such as poly(methyl 2-methylpropenoate) based polymers, lexan, or other equivalent materials that would be used to enhance passenger views of the outside surroundings. The material may be configured to have aerodynamically curved edges wherein the curves do not distort the passengers' view of the environment outside. The module 36 may include sun shades, photochromic windows (e.g. embedding microcrystals of silver halides within the material), or electrochromic windows (e.g. nickel oxide based materials).

The module 36 may also have its own set of wheels 82 to be used for transport when loading the module on and off the command and control module 32 and to airport dock stations. The compartment wheels 82 may also be used during landing of the aircraft 10 in combination with the landing gear of the aircraft 10 or in place of the landing wheels 40 of the aircraft or when the aircraft 10 has no landing wheels 40 terminating at the end of the rotatable pylons 38. The compartment wheels 82 may be fixed or retractable. The size, weight, pressure, number, and type of tire and rims used on the compartment wheels 82 may depend on the static loading, braking, the need for flotation, desired lifespan, ground resonance, and runway stress. In one preferred embodiment, the compartment wheels may be configured to be sufficient to act alone as the rear landing gear of a fixed wing airplane. In another preferred embodiment, the compartment wheels may be configured to act as landing gear for the module 36 in situations where the module is released from the aircraft 10 during mid-flight. Brakes for the wheels may be engaged by the pilot of the aircraft or independently through controls within the module.

If the compartment wheels are used during emergency landing conditions, the compartment wheels may be retractable from the module and thus lowered away from the module 36. Lowering the compartment wheels may serve to provide improved safety to the module 36 for both absorbing the impact to the ground upon landing, and for avoiding land obstacles during landing.

The module may also include parachutes either for purposeful release in entertainment or for safety purposes such as for when the aircraft's power module is not functioning. One or more parachutes may be deployed when the module is released from the aircraft. The controls for release of the module 36 may be operated through controls within the aircraft 10 and/or through controls within the module 36. The controls for release may include the option for deploying the parachute simultaneously with the module. The one or more parachutes may be located in one location of the module or at different locations of the module depending on the trajectory of the aircraft and the safest deployment of the one or more parachutes.

Figure 2:
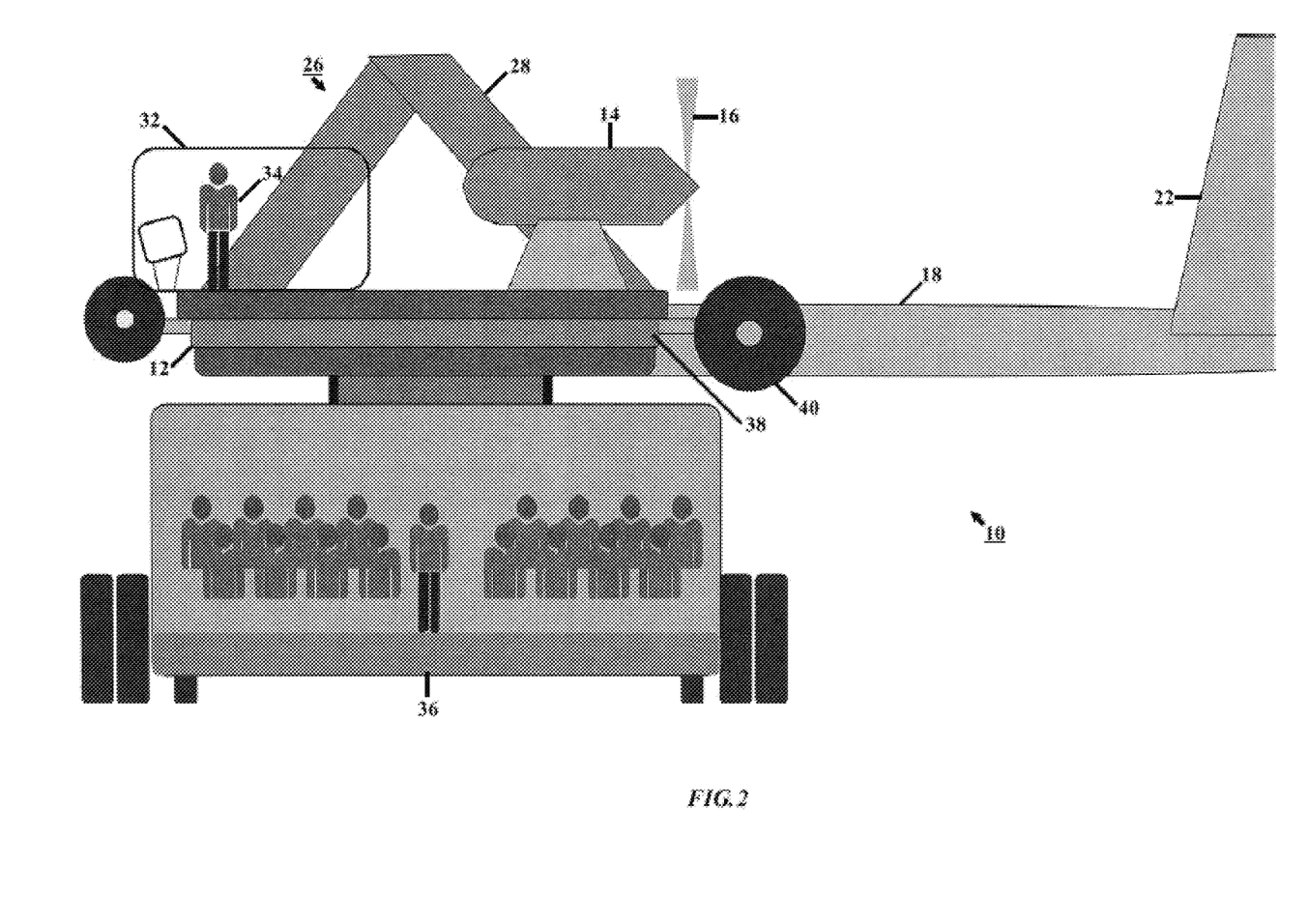
FIG. 2 is an idealized side view of the tractor aircraft and passenger module of FIG. 1.

FIG. 2 is an idealized view of the tractor aircraft 10 from the side where the module 36 has been rotated ninety degrees from the longitudinal axis of the aircraft 10. In this exemplarily view, the module 36 may be rotated to allow passengers of the module to have better views outside of the module such as popular landmarks or events. In this exemplary embodiment, the module 10 may come equipped with a rotation and/or tilting mechanism 86. The rotation and/or tilting mechanism 86 may rotate and tilt the module to a desired position while coupled to the aircraft 10. The controls for rotating and tilting the module are separate from the flight controls of the aircraft 10.

Figure 3:
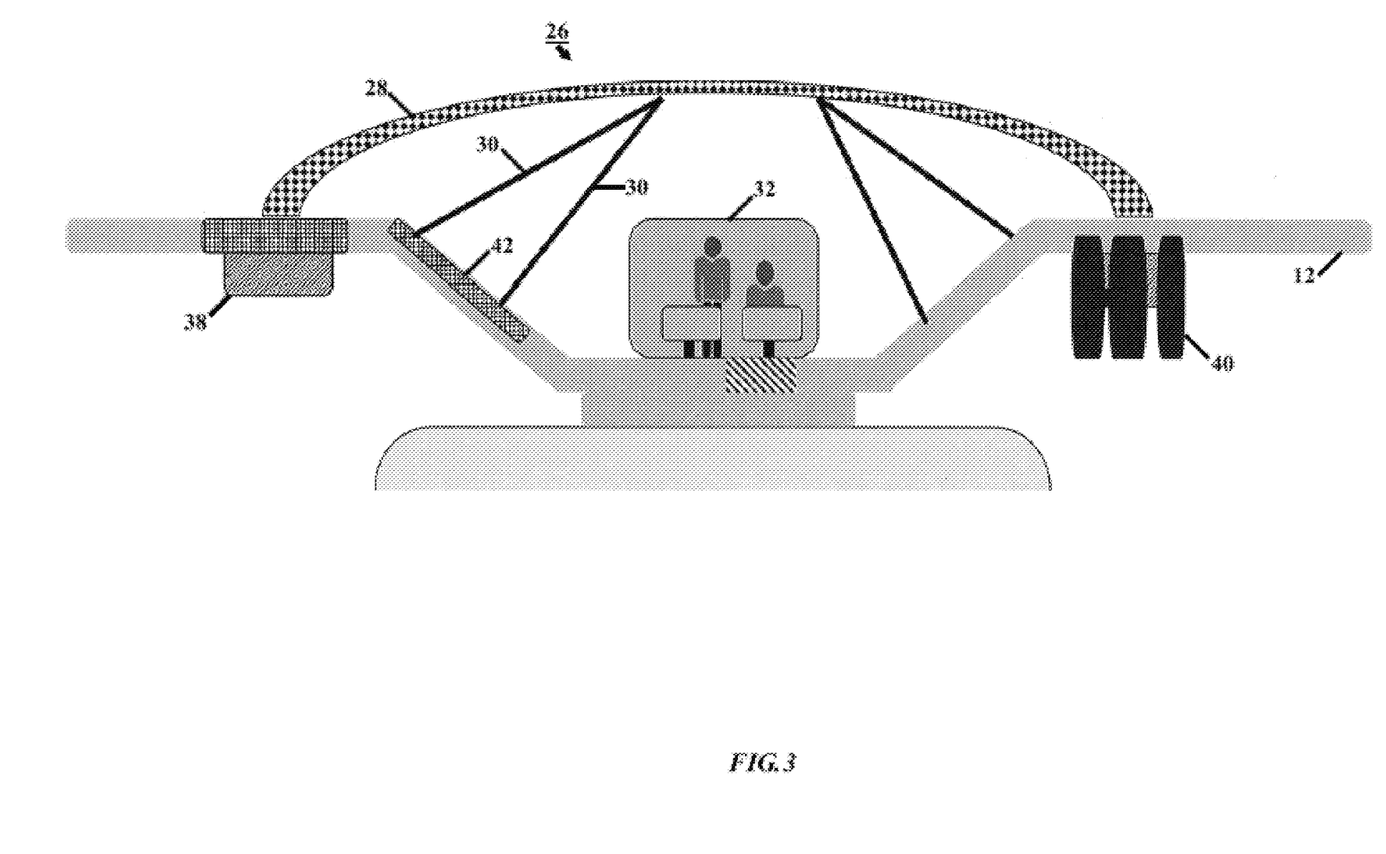
FIG. 3 is a frontal view of reinforcing support braces for the wings of the tractor aircraft of FIG. 1.
Figure 4:
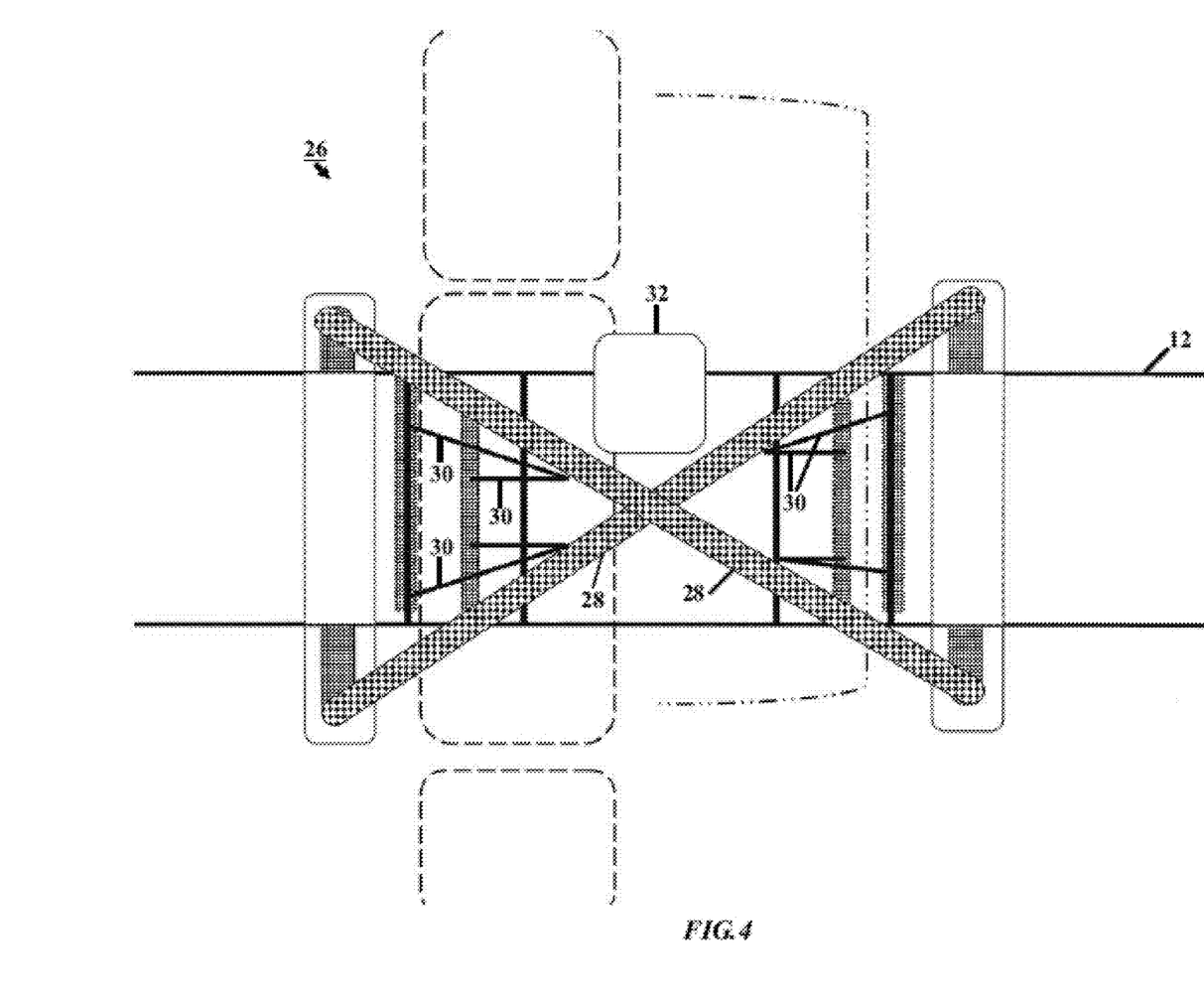
FIG. 4 is a top view of the support braces of FIG. 3.

FIG. 3 affords a better view of a means to reinforce the assembly 26. The arch 28 is anchored above the pylon 38 attachment point and the struts 30 are fastened to inner wing braces 42. In FIG. 4, a top view of the reinforcing assembly 26 better illustrates the attachment points of the arches 28 and struts 30.

Figure 5A:
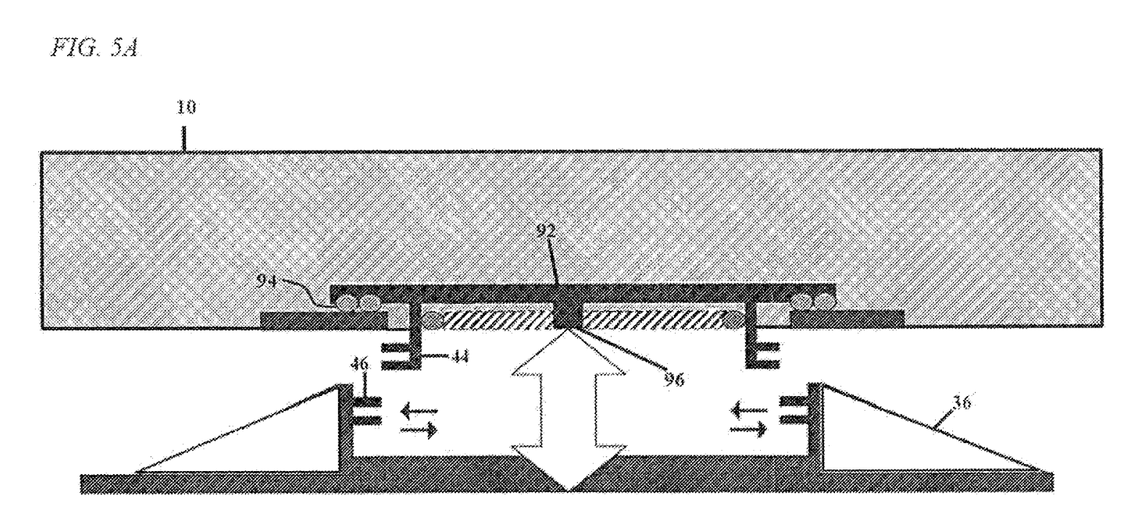
FIGS. 5A and 5B, are views of the passenger module coupling of a passenger module to the tractor aircraft.
Figure 5B:
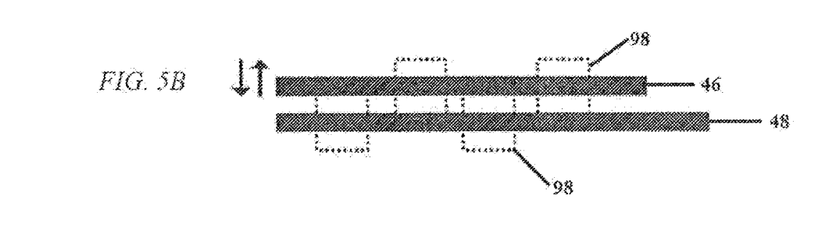
Figure 10:
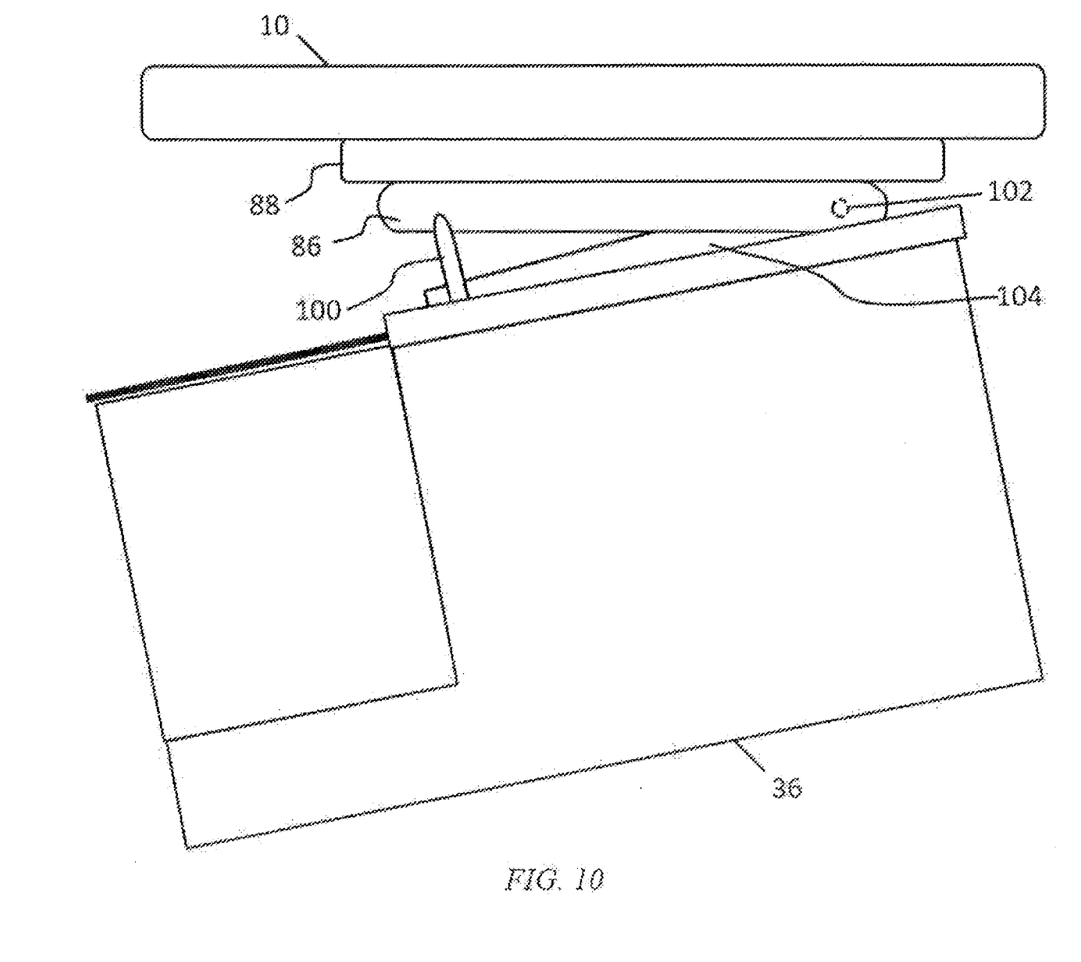
FIG. 10 is a side view of a passenger module attached to an aircraft and the tilting mechanism of the passenger module.

FIG. 10 shows module 36 attached to aircraft coupling 90 between the module 36 and the aircraft 10. In an exemplary embodiment of the coupling, FIGS. 5A, 5B, and 6 show, in idealized views, the aircraft coupling 90 that couples the aircraft 10 to the module 36. In this embodiment, the interlocking rails 44 on the aircraft 10 and interlocking rails 46 on the module 36, come together to release and attach the elements. FIG. 5A shows an example of the interlocking rails 46 in a non-interlocked configuration. To interlock rails 44 and 46, the module 36 or a portion of the module may be raised upward towards the aircraft 10. The interlocking rails 46 may then be moved toward each other such that one or more prongs 98 of each of the interlocking rails 44 and 46 may be interlocked into receiving slots within the interlocking rails 44 and 46.

The interlocking rails 44 may extend through an opening of the aircraft 10 and are connected to a coupling base 92. To rotate the module 36, the coupling base 92 may be connected to a motor that may cause the coupling base 92 to be rotated around a central axis 96. The coupling base 92 may be attached to circular tracks 94 which allows the module 36 to be rotated. An exemplary circular track 94 may include a ball bearing mechanism in which cam rollers are affixed to the coupling base 92 and allow the coupling base to be rotated around the central axis 96 of the coupling base. The motor may be housed within the body of the central axis 96 and connected to the coupling 92 through an axel for rotation (not shown). Other forms of interlocking may be applied such as clamps and locking pins or any other means of attachment known in the art. The rotation mechanism may be controlled through controls in the aircraft or from controls within the module. Such controls are separate from the flight controls of the aircraft.

Figure 6A:
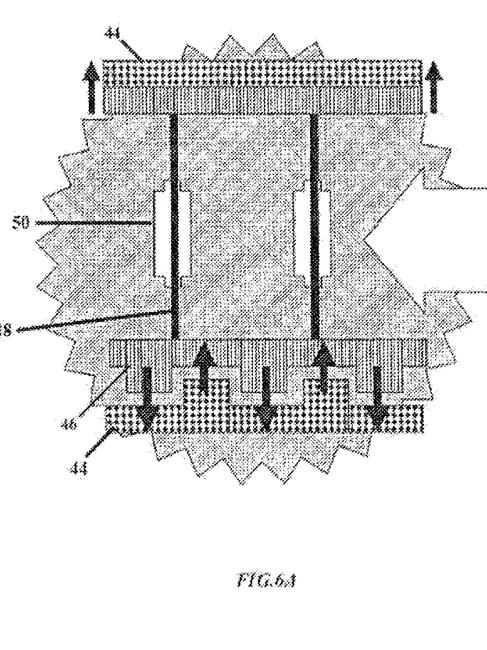
FIGS. 6A and 6B are views of a passenger module coupling mechanism from the top of the module and the bottom of the airframe, respectively.
Figure 6B:
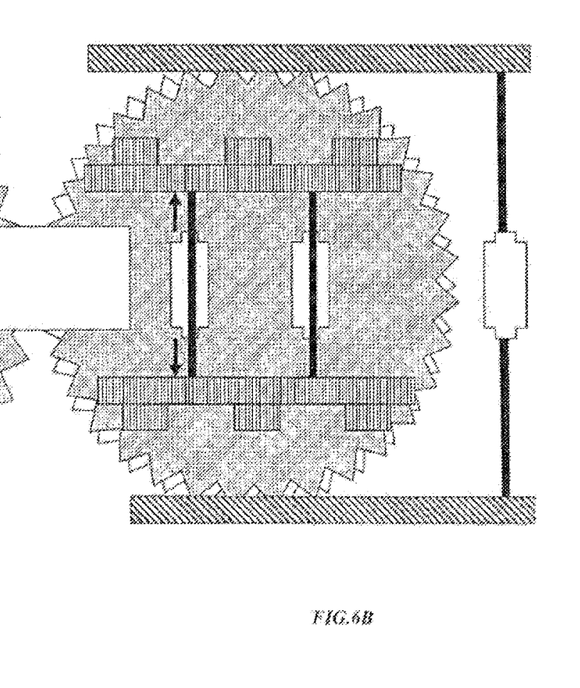
Figures 7A, 7B:
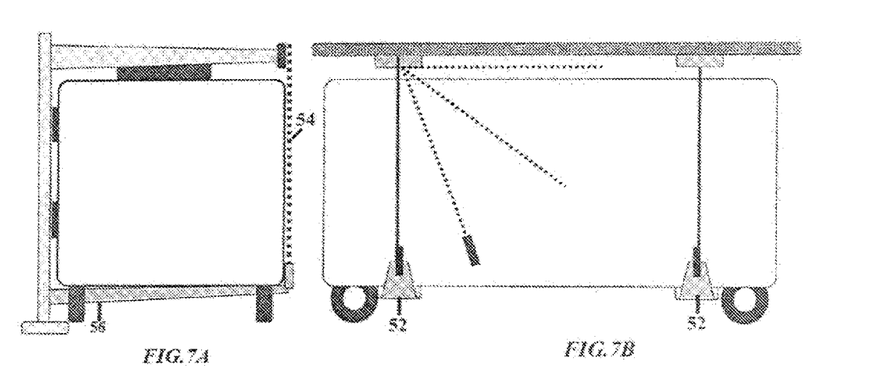
FIGS. 7A to 7E is a front and side view of a passenger module securing system showing additional detail of the elements of the securing system.
Figure 7C:
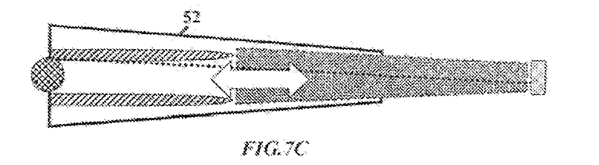
Figure 7D:
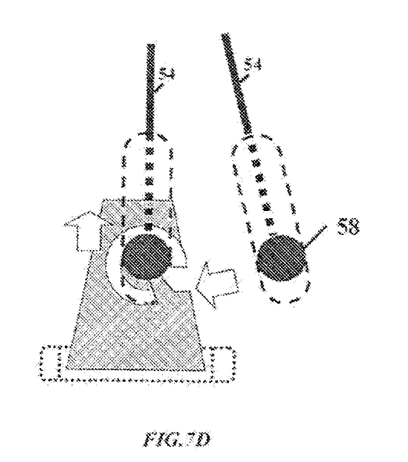
Figure 7E:
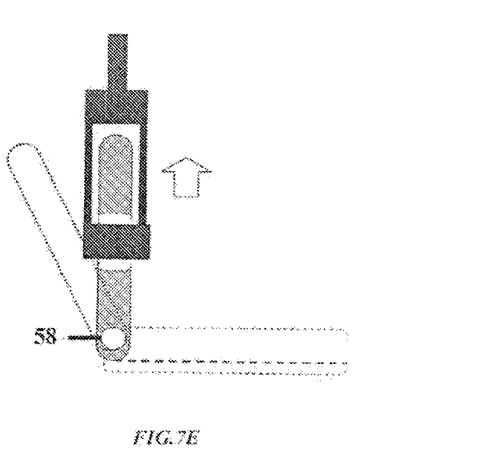

Appropriate ground based guides (not shown) assure that the aircraft 10 and the transported modules are properly aligned for secure engagement. As shown in FIGS. 6A and 6B, both the interlocking rails 44 and 46 may be moved towards or away from each other. In one embodiment, a worm screw 48 driven by a servo motor 50 can cause the rails to engage each other for transport or release them at the destination for removal.

Figure 11:
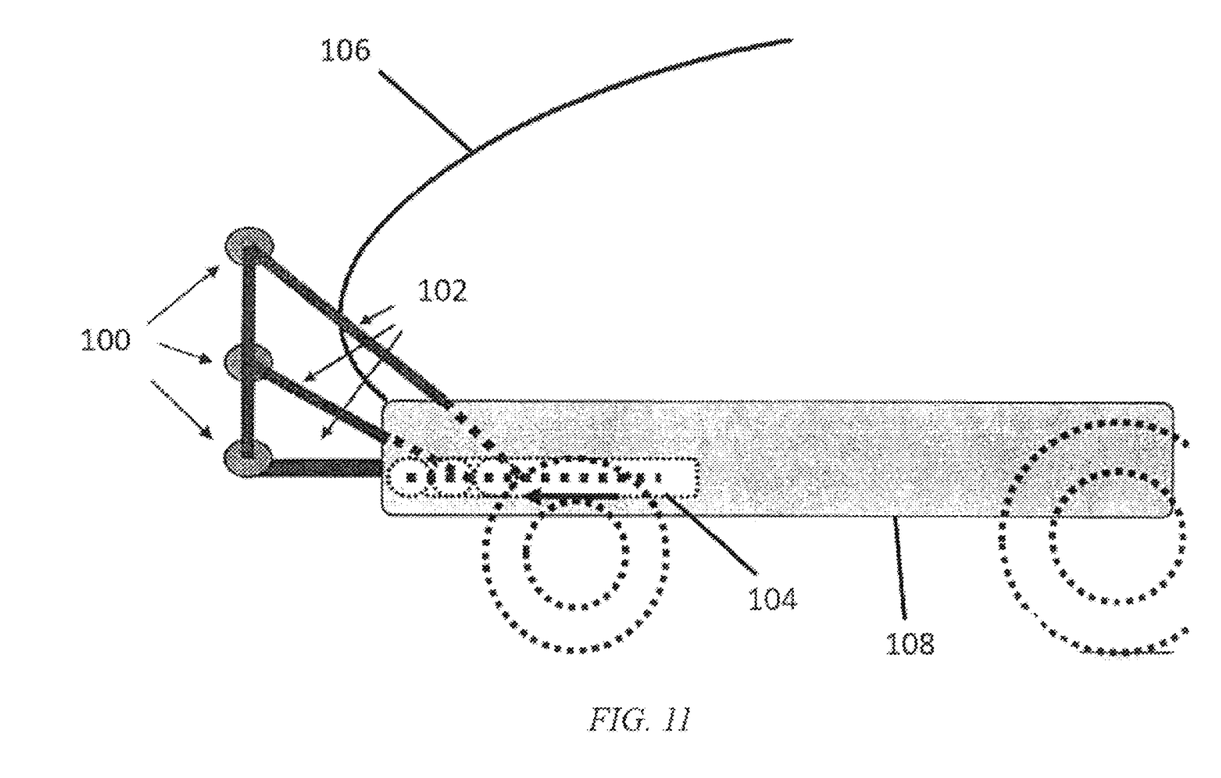
FIG. 11 is a side view of a portion of a passenger module and the crash bars in the extended configuration.

In another embodiment, the module 36 may also have a mechanism to tilt the module such that the entire module may be angled away from the longitudinal axis of the aircraft 10. Such tilting allows the passengers of the module to be able to look upward or downward with greater ease. In one exemplary embodiment, such as in FIG. 11, the module 36 may include a tilt mechanism where one or more hydraulic arms 100 may tilt the module 36 on one end of the module 36 away from the tilting base 86. On the other end, the module 36 may connected to tilting arm 104 that rotates around the tile axis 102. The tilting in another embodiment, the module may also include a plurality of cables (not shown) connected to servo motors or other equivalent mechanisms that would raise and lower the module 36 from the aircraft. Such free movement of the module 36 may be initiated when an aircraft, such as a helicopter, is moving at reduced speed or a stall speed. The module 36 may also be used on airships. The tilting mechanism may be controlled through controls in the aircraft or from controls within the module. Such controls are separate from the flight controls of the aircraft.

FIG. 7 shows apparatus for securing the transported modules to the tractor aircraft 10. A pair of tine 52 can rotate from the tractor aircraft and support the base of the transported module. Bracing cables 54 deploy downward and, with a post 56 engages the tine 52. Servo motors 58 draw the cables 54 upward which locks the post 56 into the tine 52 and assures that the load will neither shift in flight nor overly strain the attachment.

Figure 8:
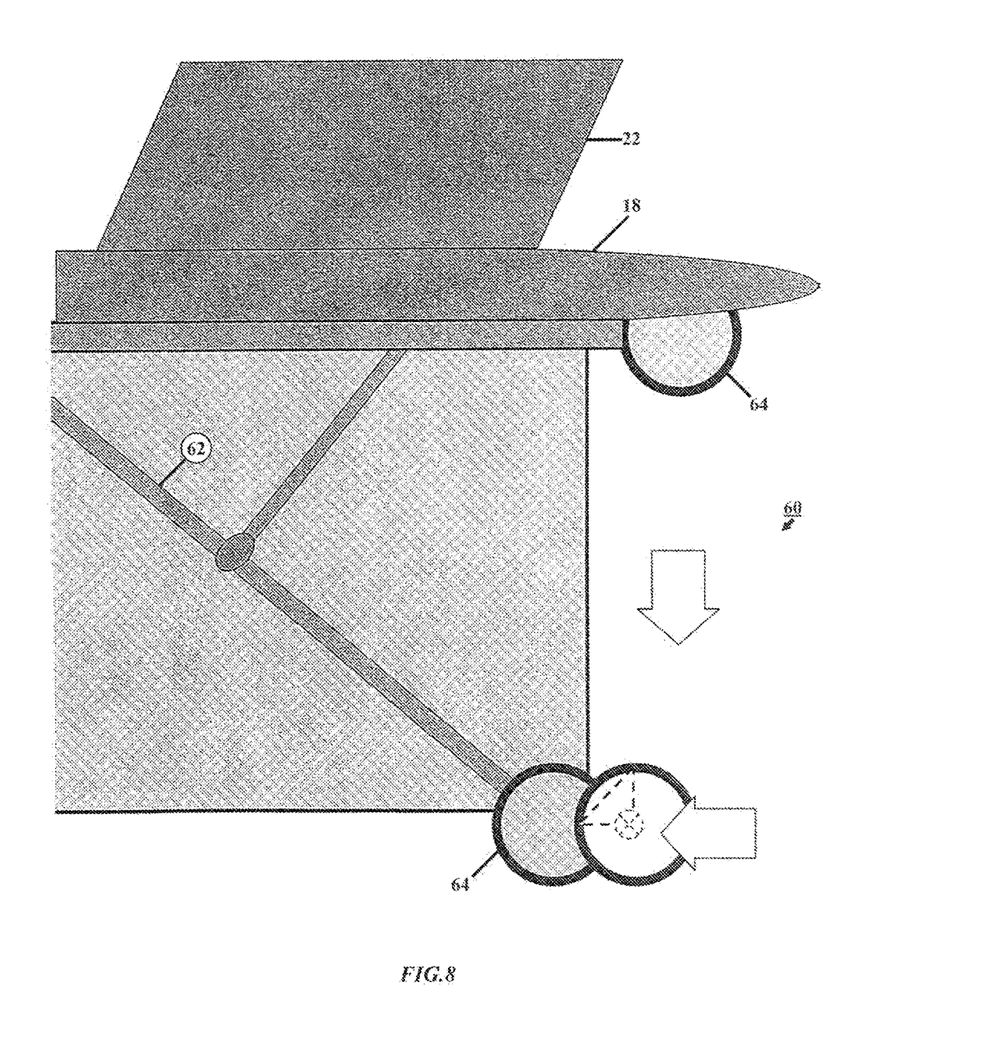
FIG. 8 is a side view of a rear landing gear assembly.

Turning next to FIG. 8, there is shown a deployable rear landing gear assembly 60 which includes a movable strut 62 that is housed adjacent the boom 18 and which terminates in a landing wheel 64. The rear landing gear protects the integrity of the cargo modules whether they are freight bearing or carry passengers.

Figure 9A:
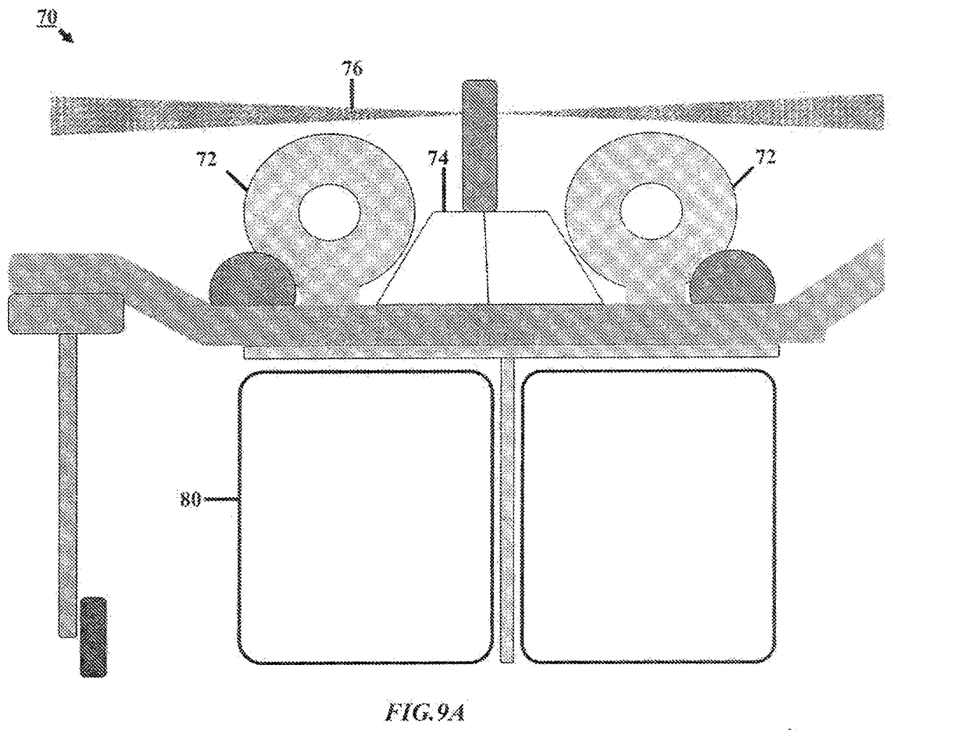
FIGS. 9A and 9B is a front sectional view and partial top view of a tractor aircraft in a helicopter embodiment.
Figure 9B:
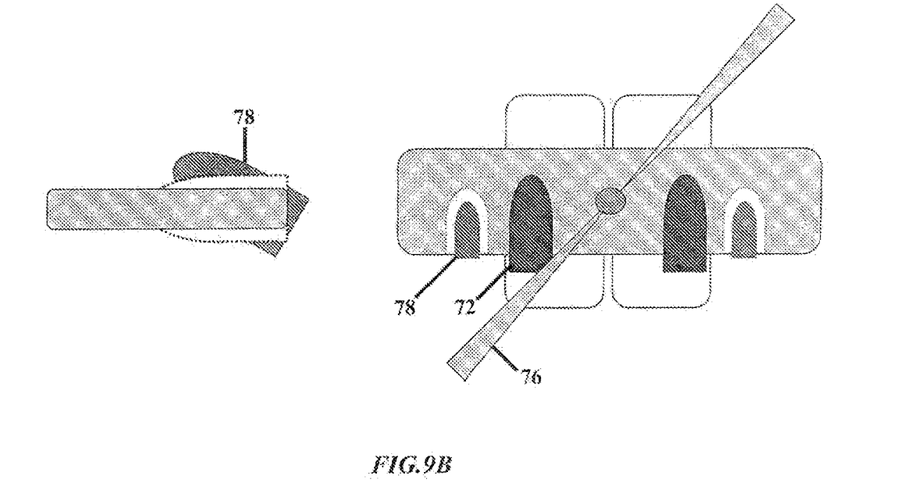

Turning now to FIG. 9, there is shown an alternative embodiment of the present invention where the tractor aircraft is a helicopter 70. In a preferred embodiment, the helicopter can resemble the Sikorsky Skycrane. As shown in FIG. 9, the helicopter 70 is provided with twin jet engines 72 which, through transmission 74 powers the rotor 76. For added safety, a pair of rocket pods 78 are installed which can, in the event of an engine or rotor failure, provide lift and propulsion until a safe area to land can be provided. A pair of cargo modules 80 are shown in tandem. As with the fixed wing aircraft embodiment, the modules 80 can carry cargo or passengers. Appropriate means are provided to attach the modules 80 to the tractor helicopter 70, and an apparatus similar to that earlier described.

In FIG. 12, the module 36 includes a safety system that utilizes crash bars 100, which allow protection to the forward window 106 of the module in case of an emergency landing. The window 106 may be constructed of materials such as plexiglass, which is defined as a brand name for a thermoplastic polymer of methyl methacrylate that is light in weight, resistant to weathering, and capable of being bent when hot but returning to its original shape when reheated. Crash bars 100 may be permanently fixed or be allowed to extend outwardly under certain emergency conditions. The crash bars 100 may extend across the front of the module 36. The crash bars may also be retractable with arms 102 that are extended through springs. In embodiments where the crash bars are extendable, the crash bars may be housed channels 104 or tubing. The channels 104 may be located within the module's base floor 108. When the crash bars 100 are retracted, the crash bars 100 are placed in a collapsed folded configuration. When extended, the arms 102 may be a telescopic rail unit. The bottom rails may extend straight out as the other two ascend via connector arm and lock. When used primarily for emergency landings, the crash bars may be extended by the pilot prior to a crash-landing or by controls within the module or automatically activated under certain emergency conditions.

In addition, some embodiments of the passenger module may be sealed and water-tight, may float, and may have an emergency escape hatch in rear top of the passenger module, which may also be used by the pilot/copilot to enter the passenger module.

In operation with either the fixed wing aircraft 10 or the helicopter 70, the modules to be transported are placed in a pick up area. The tractor aircraft lands and, if transporting modules to the destination, these modules are decoupled and moved away from the aircraft. The new modules are then positioned to be attached to the craft which, when loaded, departs to a destination where these new modules can be deposited. Much as with tractor-trailer combinations, trailers are connected at a departure point and disconnected at a destination point. The tractor aircraft needs only the barest of amenities. Such aircraft is ideal for tourism and sightseeing since the altitude and speeds need not be great. Obviously, if intended for long distance travel, modifications would be made to provide pressurization for higher altitude travel. However, it would seem that the basic configurations would be well suited for short haul utilization.

Others skilled in the art can provide yet other embodiments employing the concepts of the present invention. Accordingly, the breadth of the invention should only be limited by the scope of the claims appended hereto.

What is claimed is:

1. A detachable passenger module for an aircraft comprising:
   a seating area wherein seats are placed within the said seating area; exterior walls, a floor, and a ceiling wherein the exterior walls and the ceiling fully encloses the entire seating area separate from a fuselage of the aircraft;
   at least a portion of the exterior walls and the ceiling are continuously transparent, and the continuously transparent portion of the exterior walls and the ceiling allowing a substantially unobstructed view of the outside surroundings from within the passenger module;
   at least one interlocking rail wherein the interlocking rail extends from the passenger module and the at least one interlocking rail is detachably fastened to the aircraft, wherein a vertical length of the at least one interlocking rail is not longer than a height of the detachable passenger module and the vertical length of the at least one interlocking rail is fixed;

a rotating mechanism, which actuates rotation of the entire passenger module while fastened to the aircraft, the rotating mechanism separate from flight controls which controls a flight of the aircraft;

a tilting mechanism which actuates a tilting of the entire passenger module away from the aircraft which the passenger module is fastened to the aircraft;

a set of wheels connected to the passenger module used as landing gear of the passenger module; and crash bars affixed to a front of the passenger module.

2. The detachable passenger module of claim 1, wherein the exterior walls and the ceiling comprises photochromic materials.

3. The detachable passenger module of claim 1, wherein the crash bars extend and unfold into a stable configuration in front of the passenger module from a compact configuration from a housing of the crash bars connected to the passenger module.

4. An aircraft comprising:
a fuselage;
flight controls which control a flight of the aircraft;
a passenger module wherein said passenger module is detachable from the fuselage of the aircraft;
at least one interlocking rail wherein said interlocking rail is detachably connecting the passenger module to the fuselage, wherein a vertical length of the at least one interlocking rail is not longer than a height of the passenger module and the vertical length of the at least one interlocking rail is fixed;

the passenger module having a fully enclosed seating area, a controller that controls the rotation and tilting of the passenger module and not the flight of the aircraft; and a rotating mechanism that actuates rotation of the entire passenger module around a central axis connected to the aircraft.

5. The aircraft of claim 4 comprising further a tilting mechanism which actuates tilting of the passenger module wherein said passenger module is positioned such that an end is angled away from the fuselage.

6. The aircraft of claim 4 comprising further a lowering mechanism wherein said passenger module is lowered relative to the fixed point on the fuselage and said lowering mechanism is controlled by the controller and not by the flight controls.

7. The aircraft of claim 4, wherein the passenger module comprises transparent exterior walls and a transparent ceiling.

8. The passenger module of claim 4 comprising a galley.

9. The aircraft of claim 4 comprising a set of landing gear on the aircraft and a set of landing gear on the passenger module.

10. The aircraft of claim 4 having a module with wheels which is used as landing gear for the aircraft.

11. The aircraft of claim 10, wherein the wheels are supplemental to a set of landing gear on the aircraft.

12. The aircraft of claim 4, wherein the passenger module comprises extendable crash bars that extend and unfold to a front portion of the passenger module.

* * * * *